United States Patent [19]

Weber et al.

[11] Patent Number: 4,774,263

[45] Date of Patent: Sep. 27, 1988

[54] PROCESS FOR THE PRODUCTION OF ELASTIC MOLDED ARTICLES

[75] Inventors: Christian Weber; Hans Wirtz, both of Leverkusen; Klaus Seel, Cologne, all of Fed. Rep. of Germany

[73] Assignee: Bayer Aktiengesellschaft, Leverkusen, Fed. Rep. of Germany

[21] Appl. No.: 443,414

[22] Filed: Nov. 22, 1982

[30] Foreign Application Priority Data

Dec. 2, 1981 [DE] Fed. Rep. of Germany ....... 3147736

[51] Int. Cl.[4] .............................................. C08G 18/14

[52] U.S. Cl. ...................................... 521/51; 264/45.5; 264/51; 264/328.1; 264/328.6; 264/328.8; 521/163; 521/167; 528/68; 528/76; 528/77

[58] Field of Search ..................... 264/45.5, 51, 328.1, 264/328.6, 328.8; 521/51, 163, 167; 528/68, 76, 77

[56] References Cited

U.S. PATENT DOCUMENTS

| | | | |
|---|---|---|---|
| 3,726,952 | 4/1973 | Boden et al. | 264/48 |
| 3,838,076 | 9/1974 | Moss et al. . | |
| 3,925,527 | 12/1975 | Kleimann et al. | 264/53 |
| 3,993,606 | 11/1976 | von Bonin et al. . | |
| 4,024,090 | 5/1977 | von Bonin et al. . | |
| 4,033,912 | 7/1977 | Kleimann et al. . | |
| 4,058,492 | 11/1977 | von Bonin et al. . | |
| 4,076,695 | 2/1978 | Keil . | |
| 4,098,731 | 7/1978 | von Bonin et al. | 521/51 |
| 4,111,861 | 9/1978 | Godlewski | 521/183 |
| 4,201,847 | 5/1980 | Kleimann et al. | 521/172 |
| 4,218,543 | 8/1980 | Weber et al. | 521/51 |
| 4,246,363 | 1/1981 | Turner et al. | 521/163 |
| 4,269,945 | 5/1981 | Vanderhider et al. | 521/159 |
| 4,396,729 | 8/1983 | Dominquez et al. | 521/51 |
| 4,433,067 | 2/1984 | Rice et al. | 521/160 |
| 4,444,910 | 4/1984 | Rice et al. | 521/51 |

FOREIGN PATENT DOCUMENTS

| | | |
|---|---|---|
| 069286 | 6/1982 | European Pat. Off. . |
| 969114 | 9/1964 | United Kingdom . |
| 1049644 | 11/1966 | United Kingdom . |
| 1326901 | 8/1973 | United Kingdom . |
| 1365215 | 8/1974 | United Kingdom . |
| 1520557 | 8/1978 | United Kingdom . |

OTHER PUBLICATIONS

Kunststoff-Handbuch, vol. 7, "Polyurethane" (1966), pp. 4-5.

Abstract of Japanese publication 74018-74640.

*Primary Examiner*—Maurice J. Welsh

*Attorney, Agent, or Firm*—Gene Harsh; Joseph C. Gil; Lyndanne M. Whalen

[57] ABSTRACT

Elastic molded articles having a closed surface layer are made from polyurea elastomers by the reaction injection molding technique. These polyurea elastomers are prepared from a polyisocyanate in which all of the isocyanate groups are aromatically bound, a polyether and a diamine. The polyether has at least two isocyanate-reactive groups and a molecular weight from 1800 to 12,000. At least 50% of the isocyanate-reactive groups in the polyether are pjrimary and/or secondary amino groups. The diamine has a molecular weight from 108 to 400 and primary and/or secondary aromatically bound amino groups. Known auxiliary agents and additives may also be employed.

14 Claims, No Drawings

PROCESS FOR THE PRODUCTION OF ELASTIC MOLDED ARTICLES

BACKGROUND OF THE INVENTION

The present invention relates to a one-shot process for the production of elastic molded articles having a closed surface layer by the reaction injection molding technique.

The production of molded articles having a closed surface layer by the isocyanate polyaddition process is known. Such articles may be made, for example, by introducing a reactive (optionally foamable) mixture based on compounds containing several reactive hydrogen atoms and polyisocyanates into a mold (see e.g. German Auslegeschrift No. 1,196,864). The compounds with reactive hydrogen atoms typically used are polyethers containing hydroxyl groups. Examples of suitable polyisocyanates include 2,4- and 2,6-tolylene diisocyanate, their isometric mixtures and polyphenyl-polymethylene polyisocyanates obtained by anilineformaldehyde condensation followed by phosgenation. Water and/or fluorinated hydrocarbons may be used as blowing agents. Catalysts known to those in the art to be useful for the production of polyurethanes are generally also used.

Depending upon the starting components (and chain lengthening agents such as glycols or diamines if used) used, it is possible to obtain both elastic and rigid products and variations between these extremes by this procedure. For molded articles that must withstand heavy wear, it is customary to use slightly branched raw materials because such materials yield a product having elastomer-like characteristics. Molded articles of this kind have been produced on a technical scale (e.g. as shoe soles in the shoe manufacturing industry). Large molded articles of this type are used in the automobile industry. These car body parts are generally manufactured by the so called reaction injection molding process (RIM process). This molding process employs a special technique of filling a mold in which the highly reactive, liquid starting components are mixed in so called positively controlled or force operated mixing heads and then injected into the mold at high speed by high pressure dosing apparatus operating at a high output rate.

German Offenlegungsschrift No. 2,622,951 (U.S. Pat. No. 4,218,543) describes how even extremely reactive systems such as one-shot mixtures of diisocyanates or polyisocyanates based on 4,4'-diisocyanato diphenyl methane which are liquid at room temperature, active aromatic polyamines, relatively high molecular weight polyhydroxyl compounds containing primary hydroxyl groups and powerful catalysts with cream times of even less than 1 second can be processed by this method. In such systems, the transition from the liquid to the solid phase is virtually instantaneous, so that the liquid reaction mixture solidifies on the walls of the mold. One advantage of this system is that removal from geometrically simple plate shaped molds does not require the use of external mold release agents. Where such mold release agents are required for mass production, the mold release agents must be applied at regular intervals and during the time of their application, the mold is unavailable for production. Fine grooves etched into the mold gradually become covered with residues of mold release agent. Removal of these firmly adhering residues from the molds (which are in many cases highly contoured) can only be achieved with great difficulty. Moreover, the molded articles are covered with a thin film of mold release agent to which lacquer systems will not adhere. The molded articles must therefore be rubbed down before they are lacquered, or washed with solvent to ensure firm adherence of the lacquer to the plastic surface.

If the mold release agents known from the patent literature, such as those which are quite suitable for the production of self-releasing foam products based on polyurethanes (see e.g. British Pat. No. 1,365,215, U.S. Pat. Nos. 3,726,952; 4,033,912; 4,024,090; 4,058,492 and 4,076,695, and German Offenlegungsschriften Nos. 2,427,273; 2,431,968; 2,307,589 and 2,319,648) are used with the special reaction mixtures described in German Offenlegungsschrift No. 2,622,951, those release agents generally improve the ease of separation of the elastomers produced by the reaction injection molding technique slightly, if at all. Moreover, inclusion of mold release agents containing acid groups (in particular carboxyl groups) in the formulations of German Offenlegungsschrift No. 2,622,951 interferes with catalysis of the highly reactive systems so that the molded products obtained have no initial strength.

SUMMARY OF THE INVENTION

It is an object of the present invention to provide a process for the production of elastomeric molded articles which employs the reaction injection molding technique.

It is also an object of the present invention to provide a process for the production of elastomeric molded articles in which an external mold release agent need not be employed.

It is yet another object of the present invention to provide a process capable of producing thin-walled molded articles without using an external mold release agent.

These and other objects which will be apparent to those skilled in the art are accomplished by reacting as a one-shot system a mixture comprising a diisocyanate and/or polyisocyanate in which all of the isocyanate groups are aromatically bound, a polyether, a diamine and optionally, auxiliary agents and additives. The polyether employed must have at least two isocyanate reactive groups of which at least 50% are primary and/or secondary amino groups and a molecular weight from 1800 to 12,000. The reactant diamine should have a molecular weight from 108 to 400 and primary and/or secondary amino groups. This reaction mixture is molded by the reaction injection method (RIM).

DETAILED DESCRIPTION OF THE INVENTION

It has been surprisingly found that when the relatively high molecular weight polyhydroxyl compounds used in a system such as that disclosed in German Offenlegungsschrift No. 2,622,951 are replaced by similar compounds having amino end groups, that tertiary amines or organic tin compounds catalysts need not be used. Further, use of internal mold release agents substantially improves the mold release characteristics of the articles produced by the process of the present invention. Therefore, external mold release agents need not be employed in the process of the present invention.

The present invention relates to a process for the production of elastic molded articles which may typically have a density of from 0.8 to 1.4 g/cc and a closed surface layer. These articles are produced by reacting inside a closed mold a reaction mixture of (a) a polyisocyanate component consisting of at least one di- or polyisocyanate containing exclusively aromatically bound isocyanate groups; (b) compounds having a molecular weight of from 1,800 to 12,000 containing at least two isocyanate reactive groups; (c) diamines in the molecular weight range of 108–400 having two primary and/or secondary (preferably primary) aromatically bound amino groups; and optionally, (d) auxiliary agents and additives known to those skilled in the art of polyurethane chemistry. The reactants in this mixture are processed as a one-shot system by the reaction injection molding techinque. The isocyanate reactive compounds used as component (b) should be polyethers in which at least 50% of the isocyanate reactive groups are primary and/or secodary amino groups.

The polyisocyanate (component a)) used in the process of the present invention is an aromatic diisocyanate and/or polyisocyanate, i.e., a polyisocyanate in which all of the isocyanate groups are aromatically bound. Examples of such compounds include 2,4- and/or 2,6-diisocyanatotoluene; 2,2'-, 2,4'- and/or 4,4'-diisocyanatodiphenyl methane, mixtures of the last-mentioned isomers with their higher homologues (such as are obtained from the known reaction of phosgenation of aniline/formaldehyde condensates); compounds containing urethane groups obtained as products of reaction of the above-mentioned di- and/or polyisocyanates with subequivalent quantities of aliphatic polyhydroxyl compounds having molecular weights of from 62 to 700, (e.g. ethylene glycol, trimethylol propane, propylene glycol, dipropylene glycol or polypropylene glycols within the above-mentioned molecular weight range); di- and/or polyisocyanates modified by the partial carbodiimidization of the isocyanate groups of the above-mentioned di- and/or polyisocyanates; methyl-substituted diisocyanates of the diphenyl methane series or mixtures thereof (for example, those described in European Specification No. 0,024,665); or any mixtures of such aromatic di- and polyisocyanates.

Included among the preferred isocyanate starting materials (used as component (a)) are the derivatives of 4,4'-diisocyanatodiphenyl methane which are liquid at room temperature. Specific examples of such compounds are polyisocyanates containing urethane groups obtainable according to German Pat. No. 1,618,380 (U.S. Pat. No. 3,644,457) by reacting 1 mol of 4,4'-diisocyanatodiphenyl methane with from 0.05–0.3 mol of low molecular weight diols or triols, (preferably polypropylene glycols having a molecular weight below 700); diisocyanates based on 4,4'-diuisocyanato diphenyl methane containing carbodiimide and/or urethane imine groups, such as those disclosed in U.S. Pat. Nos. 3,152,162; 3,384,653 and 3,449,256, German Offenlegungsschrift No. 2,537,685 and European Specification No. 5233 (U.S. Ser. No. 903,308). Also included among the preferred polyisocyanates are the corresponding modification products based on mixtures of 2,4'- and 4,4'-diisocyanatodiphenyl methane or mixtures of the above-described modified 4,4'-diisocyanatodiphenyl methanes with minor quantities of higher than difunctional polyisocyanates of the diphenyl methane series. Such polyisocyanates are described in German Offenlegungsschrift No. 2,624,526. The preferred polyisocyantes are generally polyisocyanates or polyisocyanate mixtures of the diphenyl methane series which are liquid at room temperature and have optionally been chemically modified as described above, with an average isocyanate functionality of from 2 to 2.2 (preferably 2) containing 4,4'-diisocyanatodiphenyl methane as the main component (amounting to more than 50 wt. %).

The polyethers used (as component (b)) in the present invention contain at least two isocyanate reactive groups in end positions and have an average molecular weight (calculated from the functionality and the isocyanate reactive group content) of from 1,800 to 12,000, preferably from 2,000 to 8,000. At least 50 equivalent percent (preferably from 80–100 equivalent percent) of the isocyanate reactive end groups are primary and/or secondary (preferably primary) aromatically or aliphatically (preferably aliphatically) bound amino groups with the remainder being primary and/or secondary aliphatically bound hydroxyl groups. When polyether mixtures are used, individual components of the mixture may have a molecular weight below 1,800 (for example between 500 and 1,800), provided that the average molecular weight of the mixture is within the range of 1,800 to 12,000. The use of such mixtures in which individual components have a molecular weight below 1,800 is, however, not preferred.

Compounds containing amino end groups may also be attached to the polyether chain by urethane or ester groups. These "amino polyethers" may be prepared by known methods. One such method is the amination of polyhydroxy polyethers (e.g., polypropylene glycol ethers) by a reaction with ammonia in the presence of Raney nickel and hydrogen (Belgian Pat. No. 634,741). U.S. Pat. No. 3,654,370 discloses the preparation of polyoxyalkylene polyamines by reaction of the corresponding polyol with ammonia and hydrogen in the presence of a nickel, copper, chromium catalyst. The preparation of polyethers containing amino end groups by the hydrogenation of cyanoethylated polyoxypropylene ethers is described in German Pat. No. 1,193,671. Other methods for the preparation of polyoxyalkylene (polyether) amines are described in U.S. Pat. Nos. 3,155,728 and 3,236,895 and French Patent No. 1,551,605. French Patent No. 1,466,708, discloses the preparation of polyethers containing secondary amino end groups.

Relatively high molecular weight polyhydroxypolyethers suitable for the process of the present invention may be converted into the corresponding anthranilic acid esters by reaction with isatoic acid anhydride. German Offenlegungsschriften Nos. 2,019,432 and 2,619,840 and U.S. Pat. Nos. 3,808,250; 3,975,428 and 4,016,143 disclose methods for making polyethers containing aromatic amino end groups.

Relatively high molecular weight compounds containing amino end groups may be obtained according to German Offenlegungsschrift No. 2,546,536 or U.S. Pat. No. 3,865,791 by reacting isocyanate prepolymers based on polyhydroxy polyethers with hydroxyl-containing enamines, aldimines or ketimines and hydrolyzing the reaction product.

The aminopolyethers which have been obtained by the hydrolysis of compounds containing isocyanate end groups are preferred starting materials (German Offenlegungsschrift No. 2,948,419). Polyethers preferably containing two or three hydroxyl groups are reacted (in the process disclosed in German Offenlegungsschrift No. 2,948,419) with polyisocyanates to form isocyanate prepolymers and the isocyanate group is then converted in a second step into an amino group by hydrolysis.

The "amino polyethers" used (as component b)) in the present invention are in many cases mixtures of the compounds described above. These mixtures generally should contain (on a statistical average) two to three isocyanate reactive end groups.

In the process of the present invention, the "amino polyethers" may also be used as mixtures with polyhydroxy polyethers which are free from amino groups (such as those exemplified in U.S. Pat. No. 4,218,543 or even highly branched polyetherpolyols having an average hydroxyl-functionality of about 3 to 6 and molecular weights of about 500 to 1000), although such mixtures are not preferred. If such mixtures are used, however, it is necessary to ensure that at least 50 equivalent percent of the isocyanate reactive groups present in the mixture are primary and/or secondary amino groups.

The diamines used as component (c) in the process of the present invention have a molecular weight from 108–400 and contain exclusively aromatically bound primary or secondary (preferably primary) amino groups. Examples of such diamines are: 1,4-diaminobenzene, 2,4-diaminotoluene, 2,4'- and/or 4,4'-diaminodiphenyl methane, 3,3'-dimethyl-4,4'diaminodiphenyl methane, 4,4'-diaminodiphenylpropane-(2,2) and mixtures of such diamines.

The preferred diamines have alkyl substituents in at least one position which is ortho to the amino groups. The most preferred diamines are those in which at least one alkyl substituent is present in the position ortho to the first amino group and two alkyl substituents are located in the position ortho to the second amino group, each alkyl substituent having 1 to 3 carbon atoms. It is particularly preferred to use such compounds in which an ethyl, n-propyl and/or isopropyl substituent is present in at least one position ortho to the amino groups and possibly methyl substituents in other positions ortho to the amino groups.

Specific examples of preferred amines are; 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl-3,5-diethyl-2,6-diaminobenzene, 4,6-dimethyl-2-ethyl-1,3-diaminobenzene, 3,5,3',5'-tetraethyl-4,4'-diaminodiphenyl methane, 3,5,3',5'-tetraisopropyl-4,4'-diaminodiphenyl methane and 3,5-diethyl-3',5'-diisopropyl-4,4-diaminodiphenyl methane.

The above-mentioned aromatic diamines may, of course, also be used as mixtures. It is particularly preferred to use 1-methyl-3,5-diethyl-2,4-diaminobenzene or a mixture of this compound with 1-methyl-3,5-diethyl-2,6-diaminobenzene.

The diamine chain lengthening agent (component (c)) in the process of the present invention is preferably used in quantities of from 5 to 50 wt. %, most preferably from 10 to 40 wt. % (based on the polyether used as component b)).

One of the main advantages of the process of the present invention (in contrast to that of German Offenlegungsschrift No. 2,622,951) is that known mold release agents may be used to produce molded articles which have excellent mold release characteristics. Such internal mold release agents are among the auxiliary agents which may advantageously be used in the process of the present invention. In principle, any mold release agent known in the art may be used in the present invention but internal mold release agents such as those described, for example, in German Offenlegungsschrift No. 1,953,637 (U.S. Pat. No. 3,726,952), German Offenlegungsschrift No. 2,121,670 (British Pat. No. 1,365,215), German Offenlegungsschrift No. 2,431,968 (U.S. Pat. No. 4,098,731) or in German Offenlegungsschrift No. 2,404,310 (U.S. Pat. No. 4,058,492) are preferred. Preferred mold release agents include the salts (containing at least 25 aliphatic carbon atoms) of fatty acids having at least 12 aliphatic carbon atoms and primary mono-, di- or polyamines containing two or more carbon atoms or amines containing amide or ester groups and having at least one primary, secondary or tertiary amino group; esters of mono- and/or polyfunctional carboxylic acids and polyfunctional alcohols containing saturated and/or unsaturated COOH and/or OH groups and having hydroxyl or acid numbers of at least five, ester type reaction products of ricinoleic acid and long chained fatty acids; salts of carboxylic acids and tertiary amines; and natural and/or synthetic oils, fats or waxes.

The oleic acid or tall oil fatty acid salts of the amine containing amide groups which has been obtained by the reaction of N-dimethylaminopropylamine with oleic acid or tall oil fatty acid is particularly preferred.

Apart from the above-described preferred mold release agents, other mold release agents known in the art may in principle be used either alone or in a mixture with the preferred mold release agents. These additional mold release agents include, for example, the reaction products of fatty acid esters with polyisocyanates (according to German Offenlegungsschrift No. 2,319,648); the reaction products of polysiloxanes containing reactive hydrogen atoms with mono- and/or polyisocyanates (according to German Offenlegungsschrift No. 2,356,692 (U.S. Pat. No. 4,033,912)); esters of mono- and/or polycarboxylic acids and polysiloxanes containing hydroxy methyl groups (according to German Offenlegungsschrift No. 2,363,452 (U.S. Pat. No. 4,024,090)); and salts of polysiloxanes containing amino groups and fatty acids (according to German Offenlegungsschrift No. 2,417,273 or German Offenlegungsschrift No. 2,431,968 (U.S. Pat. No. 4,098,731)).

If an internal mold release agent is used, it is generally used in an amount which totals from 0.1 to 25 wt. %, preferably 1 to 10 wt. % of the whole reaction mixture.

No catalyst is required for the reaction between isocyanate groups and isocyanate reactive groups of the reactant polyether and diamine (components b) and c)). However, catalysts known and commonly used in the production of polyurethane foams and microcellular elastomers are included in the group of auxiliary agents and additives appropriate to the present invention.

Suitable catalysts include tertiary amines such as triethylamine, tributylamine, N-methyl-morpholine, N-ethyl-morpholine, N-cocomorpholine, N,N,N',N'-tetramethylethylene diamine, 1,4-diazabicyclo-(2,2,2)-octane, N-methyl-N'-dimethylaminoethyl piperazine, N,N-dimethylbenzylamine, bis-(N,N-diethylaminoethyl)-adipate, N,N-diethyl benzylamine, pentamethyl diethylene triamine, N,N-dimethylcyclohexylamine, N,N,N',N'-tetramethyl-1,3-butanediamine, N,N-dimethylimidazole-$\beta$-phenylethylamine, 1,2-dimethylimidazole and 2-methylimidazole.

Organometallic catalysts may also be used in the practice of the present invention. Particularly useful organometallic catalysts include organic tin catalysts such as tin-(II) salts of carboxylic acids (e.g., tin-(II)-acetate, tin-(II)-octoate, tin-(II)-ethyl hexoate and tin- (II)-laurate) and the dialkyl tin salts of carboxylic acids (e.g., dibutyl-tin-diacetate, dibutyl-tin-dilaurate, dibutyl-tin-maleate or dioctyl-tin-diacetate) alone or in combination with tertiary amines. Other suitable catalysts and details concerning the action of these catalysts are given in Kunststoff Handbuch, Volume VII, published by Vieweg and Höchtlen, Carl Hanser Verlag, Munich 1966, e.g., on pages 96 to 102.

If a catalyst is used, quantities of about 0.001 to 10 wt. %, preferably 0.05 to 1 wt. % (based on component b)) are appropriate.

The products of the process of the present invention are preferably compact molded articles. However, blowing agents may be used to produce molded articles having a compact surface and a cellular interior. The blowing agents used may be water and/or readily volatile organic substances and/or dissolved inert gases.

Examples of suitable organic blowing agents include acetone; ethylacetate; methanol; ethanol; halogen-substituted alkanes such as methylene chloride, chloroform, ethylidene chloride, vinylidene chloride, monofluorotrichloromethane, chlorodifluoromethane and dichlorodifluoromethane; and butane, hexane, heptane or diethyl ether.

Nitrogen, air and carbon dioxide are examples of suitable inert gases.

The effect of a blowing agent may also be obtained by the addition of compounds which decompose at temperatures above room temperature to release gases, for example nitrogen. Azo compounds such as azoisobutyric acid nitrile are examples of such compounds. Other examples of blowing agents and details concerning the use of blowing agents may be found in Kunststoff Handbuch, Volume VII, published by Vieweg and Höchtlen, Carl Hanser Verlag, Munich 1966, e.g., on Pages 108 and 109, 453 to 455 and 507 to 510.

In accordance with the present invention, surface active additives (emulsifiers and foam stabilizers) may also be used as reaction mixture components. Suitable emulsifiers include the sodium salts of ricinoleic sulfonates or of fatty acids or salts of fatty acids and amines (such as oleic acid diethylamine or stearic acid diethanolamine). Alkali metal or ammonium salts of sulfonic acids (e.g. of dodecyl benzene sulfonic acid or of dinaphthyl methane disulfonic acid) or of fatty acids such as ricinoleic acid or of polymeric fatty acids may also be used as surface active additives.

If foam stabilizers are used, it is preferred that they be water soluble polyether siloxanes. These compounds are generally a copolymer of ethylene oxide and propylene oxide linked to a polydimethyl siloxane group. Foam stabilizers of this tyype are described in U.S. Pat. No. 2,764,565.

Other auxiliary agents and additives which may optionally be used in the process of the present invention include known cell regulators (such as paraffins or fatty alcohols or dimethyl polysiloxanes), known pigments, dyes and flame retarding agents (e.g., tris-chloroethyl phosphate or ammonium phosphate and polyphosphate), stabilizers against ageing and weathering, plasticizers, fungistatic and bacteriostatic substances, and fillers (such as barium sulfate, glass fibers, kieselgur or whiting).

Other examples of suitable surface active additives and foam stabilizers, flame retardants, plasticizers, dyes, fillers and fungistatic and bacteriostatic substances and details concerning the use and mode of action of these additives may be found in Kunststoff Handbuch, Volume VII, published by Vieweg and Höchtlen, Carl Hanser Verlag, Munich 1966, e.g., on pages 103 to 113.

Examples of other auxiliary agents and additives which may be used include low molecular weight polyhydric alcohols having a molecular weight of from 62 to 500, preferably of from 62 to 400 (in quantities of up to 50 equivalent percent, based on the isocyanate reactive groups of the diamine used as component (c)) in addition to the diamine chain lengthening agent (component c)) to modify the properties of the molded articles. Ethylene glycol, butane-1,4-diol, hexamethylene glycol, trimethylolpropane, diethylene glycol, triethylene glycol, dipropylene glycol, tripropylene glycol, the propoxylation products of trimethylol propane having molecular weights of up to 500 preferably of up to 400 or the propoxylation products of ethylene diamine having molecular weights of up to 500 preferably of up to 400 are examples of such alcohols. The addition of such low molecular weight polyhydroxyl compounds is, however, less preferred.

When carring out the process of the present invention, the quantity of polyisocyanate (component (a)) should preferably be such that the isocyanate index is from 70 to 130, most preferably 90 to 110 in the reaction mixture. By "isocyanate index" is meant the quotient of the number of isocyanate groups divided by the number of isocyanate reactive groups, multiplied by 100. When calculating the isocyanate index, any isocyanate reactive groups possibly present in the mold release agents (carboxyl groups) are not taken into account.

The process of the present invention is carried out by the known reaction injection molding technique (RIM process). Two reactants are generally employed in this molding technique. In the present invention, the polyisocyanate (component a)) is the first reactant and the "polyamine component" (i.e., the mixture of polyether component (b) and diamine component (c)), is the second reactant. If any auxiliary agents or additives are used, they are generally mixed with the "polyamine component". However, it may be advantageous, for example when using a mold release agent containing isocyanate groups, to incorporate the release agent with the reactant polyisocyanate (component (a)) before the process of the present invention is carried out. It is possible in principle to use mixing heads in which three or four separate components may be simultaneously introduced so that no preliminary mixing of the individual components is required. The quantity of reaction mixture introduced into the mold is generally calculated to produce molded articles having a density of from 0.8 to 1.4 g/cm$^3$, preferably from 0.9 to 1.2 g/cm$^3$. When mineral fillers are used, however, the molded articles may have a density above 1.2 g/cc. The articles may be removed from the mold after they have been left in there from 5 to 90 seconds, preferably from 20 to 60 seconds.

The reactant mixture is generally introduced into the mold at a starting temperature of from 10° to 60° C., preferably from 20° to 50° C. The temperature of the mold itself is generally from 40° to 100° C., preferably from 50° to 70° C.

The molded articles obtainable by the process of the present invention are particularly suitable for the manufacture of flexible automobile bumpers or car body parts. Appropriate variation of the starting components (particularly use of a relatively small proportion of diamine (component (c)) makes it possible, however, to obtain flexible shoe soles with good abrasion resistance and excellent mechanical strength.

Having thus described our invention, the following examples are given by way of illustration.

EXAMPLES

The formulations described in the following examples were processed by the reaction injection molding technique.

The polyamine mixture and polyisocyanate, optionally together with mold release agent to facilitate removal from the mold, were introduced into a high pressure dosing apparatus. After intensive mixing in a positively controlled mixing head, the resulting mixture was forced at very high speed into a metal mold heated to 60° C.

The aluminum box shaped mold employed produced an article having the following dimensions:

| | |
|---|---|
| Wall thickness | 4 mm |
| Area of base | 120 × 400 mm |
| Height of side | 50 to 120 mm. |

Conically tapering recesses 24 mm in depth and 3 mm in width were cut into the upper part of the mold to produce ribs in the molded article so that powerful shearing forces had to be overcome for removal of the finished product from this mold.

EXAMPLE 1

(Comparison)

77.00 parts by weight of a polyether with OH number 28 (obtained by the addition of propylene oxide followed by the addition of ethylene oxide to trimethylol propane), 23.00 parts by weight of a mixture of 65 parts by weight of 1-methyl-3,5-diethyl-phenylene diamine-(2,4) and 35 parts of 1-methyl-3,5-diethylphenylene diamine-(2,6), 0.10 parts by weight of dibutyl tin dilaurate and 0.15 parts by weight of 1,4-diazabicyclo-(2,2,2)-octane were combined to form a polyol component. This polyol component which was combined with 56.00 parts by weight of a reaction product of tripropylene glycol and 4,4'-diphenyl methane diisocyanate (23 wt. % NCO) was worked up by the RIM process.

The temperature of the raw materials was 40° C. The dwell time in the mold was 1 minute.

5 molded products were removed without the aid of external mold release agents. However, a layer formed on the surface of the mold which caused subsequently molded products to tear when attempts were made to remove them from the mold. The molded product had the following mechanical properties:

| | |
|---|---|
| Gross density (DIN 53420) | 1083 kg/m³ |
| Tensile strength (DIN 53504) | 30.4 MPa |
| Elongation at break (DIN 53504) | 352% |
| Tear propagation resistance (DIN 53515) with cut | 71.2 kN/m |
| Shore D (DIN 53505) | 54 |
| G' modulus (DIN 53445) | |
| −30° C. | 287 MPa |
| +20° C. | 128 MPa |
| +65° C. | 78.4 MPa |
| flexural modulus (ASTM 790-71) | 292 MPa |

EXAMPLE 2

(Comparison with internal mold release agent)

77.00 parts by weight of a polyether with OH number 28 (prepared by the addition of propylene oxide followed by the addition of ethylene oxide to trimethylol propane), 23.00 parts by weight of a mixture of 65 parts by weight of 1-methyl-3,5-diethyl-phenylene diamine -(2,4) and 35 parts of 1-methyl-3,5-diethylphenylene diamine- (2,6), 0.10 parts by weight of dibutyl tin dilaurate, 0.15 parts by weight of 1,4-diazabicyclo-(2,2,2)-octane and 4.60 parts by weight of the stoichiometric tall oil fatty acid salt of 1 mol of tall oil fatty acid and 1 mol of amidamine (prepared from 1 mol of 3-dimethylaminopropylamine-1 and 1 mol of tall oil fatty acid) were combined to form a polyol component. This polyol component was combined with 56.00 parts by weight of a reaction product of tripropylene glycol and 4,4'-diphenyl methane diisocyanate (23 wt. % NCO) and was worked up by the RIM process. The operating conditions employed were the same as in Example 1.

When the mold was opened, it was found that the molded product could not be removed without destroying it. The polyurethane elastomer had no strength.

EXAMPLE 3

77.00 parts by weight of an amino polyether with OH number 26 ((80 equivalent percent of amino groups, 20 equivalent percent of hydroxyl groups) obtained from the polyether polyol of Example 1 by reaction with ammonia in the presence of Raney nickel and hydrogen), 23.00 parts by weight of a mixture of 65 parts by weight of 1-methyl-3,5-diethyl-phenylene diamine-(2,4) and 35 parts of 1-methyl-3,5-diethyl-phenylene diamine-(2,6), 0.10 parts by weight of dibutyl tin dilaurate and 0.15 parts by weight of 1,4-diazabicyclo-(2,2,2)-octane were combined to form a polyamine component. This polyamine was combined with 58.00 parts by weight of a reaction product of tripropylene glycol and 4,4'-diphenyl methane diisocyanate (23 wt. % NCO). This mixture was then worked up by the RIM process. The operating conditions were the same as those used in Example 1.

When no external mold release agents were employed, from 8 to 10 molded products could be removed from the mold but subsequent products were destroyed on removal from the mold.

The molded article had the following mechanical properties:

| | |
|---|---|
| Gross density (DIN 53420) | 1069 kg/m³ |
| Tensile Strength (DIN 53504) | 35.7 MPa |
| Elongation at break (DIN 53504) | 328% |
| Tear propagation resistance (DIN 53515) with cut | 70.4 kN/m |
| Shore D (DIN 53505) | 57 |
| G' modulus (DIN 53445) | |
| −30° C. | 293 MPa |
| +20° C. | 157 MPa |
| +65° C. | 84 MPa |
| flexural modulus (ASTM-D 790-71) | 346 MPa |

EXAMPLE 4

The system of Example 3 was reacted by the RIM process without catalyst (dibutyl tin dilaurate and 1,4- diazabicyclo-(2,2,2)-octane) employing the operating conditions used in Example 1.

Without application of external mold release agents, 5 molded articles could be removed from the mold after a dwell time of 1 minute. The green strength of the articles as they were removed from the mold was excellent. The molded articles had the following mechanical properties:

| | |
|---|---|
| Gross density (DIN 53420) | 1072 kg/m$^3$ |
| Tensile strength (DIN 53504) | 27.5 MPa |
| Elongation at break (DIN 53504) | 305% |
| Tear propagation resistance (DIN 53515) with cut | 83.3 kN/m |
| Shore D (DIN 53505) | 60 |
| G' modulus (DIN 53445) | |
| −30° C. | 334 MPa |
| +20° C. | 158 MPa |
| +65° C. | 95 MPa |
| flexural modulus (ASTM-D 790-71) | 358 MPa |

EXAMPLE 5

100.00 parts by weight of the polyamine component of Example 3 were combined with 4.60 parts by weight of a tall oil fatty acid salt. This tall oil fatty acid salt was made from 1 mol of tall oil fatty acid and 1 mol of amidamine prepared from 1 mol of 3-dimethylamino-propylamine-1 and 1 mol of tall oil fatty acid. This mixture was then processed with 56.00 parts by weight of a reaction product of tripropylene glycol and 4,4-diphenyl methane diisocyanate (23 wt. % NCO) by the RIM process. The operating conditions were the same as those used in Example 1.

The molded articles could easily be removed without the aid of external mold release agents. The experimental series was stopped after more than 50 articles had been removed from the mold. No troublesome layer was found to develop on the surface of the mold.

The molded articles had the following mechanical properties:

| | |
|---|---|
| Gross density (DIN 53420) | 1093 kg/m$^3$ |
| Tensile strength (DIN 53504) | 32.6 MPa |
| Elongation at break (DIN 53504) | 318% |
| Tear propagation resistance (DIN 53515) with cut | 91.4 kN/m |
| Shore D (DIN 53505) | 66 |
| G' modulus (DIN 53445) | |
| −30° C. | 380 MPa |
| +20° C. | 173 MPa |
| +65° C. | 102 MPa |
| flexural modulus (ASTM-D 790-71) | 402 MPa |

EXAMPLE 6

73.40 parts by weight of an aminopolyether with NH number 19.4 (obtained by reaction of the polyether polyol of Example 1 with 2,4-diisocyanatotoluene followed by hydrolysis according to German Offenlegungsschrift No. 2,948,419), 22.00 parts by weight of a mixture of 65 parts by weight of 1-methyl-3,5-diethyl-phenylene diamine-(2,4) and 35 parts of 1-methyl-3,5-diethyl-phenylene diamine-(2,6), 0.10 parts by weight of dibutyl tin dilaurate, 0.15 parts by weight of 1,4-diazabicyclo-(2,2,2)-octane and 4.40 parts by weight of the stoichiometric tall oil fatty acid salt of 1 mol of tall oil fatty acid and 1 mol of amidamine (prepared from 1 mol of 3-dimethylamino-propylamine-1 and 1 mol of tall oil fatty acid) were combined to form a polyamine component. This polyamine component was then combined with 54.00 parts by weight of a reaction product of tripropylene glycol and 4,4'-diphenyl methane-diisocyanate (23 wt. % NCO) and processed by the RIM process. The processing conditions were the same as those used in Example 1.

The molded articles could easily be removed without the aid of external mold release agents. The experimental series was stopped after more than 30 articles had been removed from the mold. The formation of a troublesome layer on the surface of the mold was not observed.

The molded articles had the following mechanical properties:

| | |
|---|---|
| Gross density (DIN 53420) | 1088 kg/m$^3$ |
| Tensile strength (DIN 53504) | 33.0 MPa |
| Elongation at break (DIN 53504) | 305% |
| Tear propagation resistance (DIN 53515) with cut | 82.2 kN/m |
| Shore D (DIN 53505) | 67 |
| G' modulus (DIN 53445) | |
| −30° C. | 339 MPa |
| +20° C. | 153 MPa |
| +65° C. | 90.5 MPa |
| flexural modulus (ASTM-D 790-71) | 407 MPa |

EXAMPLE 7

55.0 parts by weight of a linear polyoxypropylene polyether with molecular weight 2,000 containing primary aliphatically bound amino end groups (Jeffamine D 2,000 of Jefferson Chemical Company), 18.30 parts by weight of the polyether polyol of Example 1, 22.00 parts by weight of a mixture of 65 parts by weight of 1-methyl-3,5-diethyl-phenylene diamine-(2,4) and 35 parts by weight of 1-methyl-3,5-diethyl-phenylene diamine-(2,6), 0.10 parts by weight of dibutyl tin dilaurate, 0.15 parts by weight of 1,4-diazabicyclo(2,2,2)-octane and 4.50 parts by weight of the stoichiometric tall oil fatty acid salt of 1 mol of amidamine (prepared from 1 mol of 3-dimethylaminopropylamine-1 and 1 mol of tall oil fatty acid), were combined to form a polyamine component. This polyamine component was combined with 60.50 parts by weight of a reaction product of tripropylene glycol and 4,4'-diphenyl methane diisocyanate (23 wt. % NCO) by the RIM process. The operating conditions were the same as those used in Example 1.

The molded articles could easily be removed from the mold without the aid of external mold release agents. The experimental series was stopped after 50 articles had been removed from the mold. No troublesome layer was found to form on the surface of the mold.

The molded articles had the following mechanical properties:

| | |
|---|---|
| Gross density (DIN 53420) | 1071 kg/m$^3$ |
| Tensile strength (DIN 53504) | 42.1 MPa |
| Elongation at break (DIN 53504) | 376% |
| Tear propagation resistance (DIN 53515) with cut | 94 kN/m |
| Shore D (DIN 53505) | 64 |
| G' modulus (DIN 53445) | |
| −30° C. | 628 MPa |
| +20° C. | 189 MPa |
| +65° C. | 86 MPa |

-continued

| | |
|---|---|
| flexural modulus (ASTM-D 790-71) | 375 MPa |

What is claimed is:

1. A process for the production of elastic molded articles having a closed surface layer by reacting as a one-shot system a mixture comprising
   (a) a diisocyanate and/or polyisocyanate in which the isocyanate groups are aromatically bound,
   (b) a polyether having at least two isocyanate-reactive groups and a molecular weight from 1800 to 12,000 in which at least 50% of the isocyanate-reactive groups are primary and/or secondary amine groups,
   (c) a diamine having a molecular weight from 108 to 400 and primary and/or secondary aromatically bound amino groups and
   (d) an internal mold release agent by a reaction injection molding technique.

2. The process of claim 1 wherein the internal mold release agent is a salt of oleic acid or tall oil fatty acid.

3. A method for making a reaction injection molded elastomer which will release from its mold without the presence of an externally applied mold release agent comprising injecting exactly two streams via a RIM machine into a mold cavity of the desired configuration, a formulation comprising in the first stream primary or secondary amine terminated polyethers of from 1800 to 12,000 molecular weight having greater than 50% of their active hydrogens in the form of amine hydrogens, a diamine having a molecular weight of from 108 to 400 and primary and/or secondary aromatically bound amino groups and an internal mold release agent, and in the second stream an aromatic polyisocyanate.

4. A method as in claim 3 wherein the amine terminated polyether has a molecular weight of from 2000 to 8,000.

5. A RIM elastomer which will release from its mold without the presence of an externally applied mold release agent made by injecting exactly two streams via a RIM machine into a mold cavity of the desired configuration, a formulation comprising in the first stream primary or secondary terminated polyethers of from 1800 to 12,000 molecular weight having greater than 50% of their active hydrogens in the form of amine hydrogens, a diamine having a molecular weight from 108 to 400 and primary and/or secondary aromatically bound amino groups and an internal mold release agent, and in the second stream an aromatic polyisocyanate.

6. A method as in claim 5 wherein the amine terminated polyether has a molecular weight of from 2,000 to 8,000.

7. A method for making a RIM elastomer which will release from its mold without the presence of an externally applied mold release agent comprising injecting exactly two streams via a RIM machine into a mold cavity of the desired configuration, a formulation comprising in the first stream primary or secondary amine terminated polyethers having a molecular weight of from 1,800 to 12,000 and having greater than 50% of their active hydrogens in the form of amine hydrogens, a diamine having a molecular weight of from 108 to 400 and primary and/or secondary aromatically bound amino groups and an internal mold release agent, and in the second stream an aromatic polyisocyanate.

8. A RIM elastomer which will release from its mold without the presence of an externally applied mold release agent made by injecting exactly two streams via a RIM machine into a mold cavity of the desired configuration, a formulation comprising in the first stream primary or secondary amine terminated polyethers having a molecular weight of from 1,800 to 12,000 and having greater than 50% of their active hydrogens in the form of amine hydrogens, a diamine having a molecular weight of from 108 and 400 and primary and/or secondary aromatically bound amino groups and an internal mold release agent, and in the second stream an aromatic polyisocyanate.

9. A method as in claim 3 wherein the amine terminated polyether has a functionality of about 2–6.

10. A method as in claim 9 wherein the functionality of the amine terminated polyethers is about 2–3.

11. A method as in claim 3 where the internal mold release agent comprises a dimethyl siloxane with organic acid groups.

12. A method as in claim 5 wherein the amine terminated polyether has a functionality of about 2–6.

13. A method as in claim 12 wherein the amine terminated polyether has a functionality of about 2–3.

14. A method as in claim 5 where the internal mold release agent comprises a dimethyl siloxane with organic acid groups.

* * * * *